United States Patent
Anderson et al.

(10) Patent No.: US 8,444,819 B2
(45) Date of Patent: May 21, 2013

(54) CATIONIC CROSSLINKED WAXY STARCH PRODUCTS, A METHOD FOR PRODUCING THE STARCH PRODUCTS, AND USE IN PAPER PRODUCTS

(75) Inventors: Kevin R. Anderson, Cedar Rapids, IA (US); David E. Garlie, Eau Claire, WI (US); James D. Steinke, Cedar Rapids, IA (US)

(73) Assignee: Cargill, Incorporated, Wayzata, MN (US)

( * ) Notice: Subject to any disclaimer, the term of this patent is extended or adjusted under 35 U.S.C. 154(b) by 620 days.

(21) Appl. No.: 11/629,842

(22) PCT Filed: Jun. 16, 2004

(86) PCT No.: PCT/US2004/019162
§ 371 (c)(1),
(2), (4) Date: Apr. 8, 2008

(87) PCT Pub. No.: WO2006/009528
PCT Pub. Date: Jan. 26, 2006

(65) Prior Publication Data
US 2009/0044922 A1    Feb. 19, 2009

(51) Int. Cl.
*D21H 17/28*    (2006.01)
*C08B 31/00*    (2006.01)

(52) U.S. Cl.
USPC ........... 162/175; 162/158; 536/106; 536/107; 536/111; 536/124

(58) Field of Classification Search
USPC .................... 162/175, 158, 185; 536/106, 47, 536/48, 50, 102, 107, 111, 124
See application file for complete search history.

(56) References Cited

U.S. PATENT DOCUMENTS

| | | | |
|---|---|---|---|
| 3,563,798 A | 2/1971 | Germino | |
| 5,122,231 A | 6/1992 | Anderson et al. | |
| 5,368,690 A | 11/1994 | Solarek et al. | |
| 5,523,339 A | 6/1996 | Solarek et al. | |
| 5,641,728 A * | 6/1997 | Dobson et al. | 507/111 |
| 5,932,017 A | 8/1999 | Chiu | |
| 6,231,675 B1 | 5/2001 | Chiu | |
| 7,160,420 B2 * | 1/2007 | Helbling et al. | 162/175 |
| 2001/0017133 A1 | 8/2001 | Chiu | |
| 2002/0088585 A1 | 7/2002 | Anderson et al. | |
| 2002/0170693 A1* | 11/2002 | Merrette et al. | 162/175 |

FOREIGN PATENT DOCUMENTS

| | | |
|---|---|---|
| EP | 1103565 A1 | 5/2001 |
| EP | 1103655 A1 | 5/2001 |
| EP | 1176254 A1 | 1/2002 |
| WO | 96/09327 A1 | 3/1996 |
| WO | 96/23104 A1 | 8/1996 |
| WO | WO-97/46591 | 12/1997 |
| WO | 00/05319 A1 | 2/2000 |
| WO | 01/51090 A2 | 7/2001 |

OTHER PUBLICATIONS

Larsson et al., The structure of cationic amylopectin as determined via mobility data compared to model calculations, Carbohydrate Research, 317 (1999), 223-228.*

"Quat 188 Modified Starch Degree of Substitution Determination", Dow Perf Materials & Basic Chem Answer Center, 2009, [online], Retrieved from the Internet, [Retrieved Sep. 11, 2012] <URL: https://dow-answer.custhelp.com/app/answers/detail/a_id/9843/~/quat-188-modified-starch-degree-of-substitution-determination>.*

European Patent Office, Supplementary European Search Report for EP 04776643.1 dated Jun. 14, 2011.

* cited by examiner

*Primary Examiner* — Mark Halpern
*Assistant Examiner* — Dennis Cordray

(57) ABSTRACT

There are disclosed cationic crosslinked waxy starch products having a Brookfield viscosity of about 700 cps to about 2500 cps and a method for preparing the starch products. Also disclosed is the use of the cationic crosslinked waxy starch products having a Brookfield viscosity of about 700 cps to about 2500 cps in the production of paper products.

32 Claims, No Drawings

CATIONIC CROSSLINKED WAXY STARCH PRODUCTS, A METHOD FOR PRODUCING THE STARCH PRODUCTS, AND USE IN PAPER PRODUCTS

CROSS-REFERENCE TO RELATED APPLICATION

The present application is a U.S. National Phase application of PCT/US2004/019162, filed Jun. 16, 2004, the disclosure of which is incorporated herein by reference in its entirety.

TECHNICAL FIELD

The present invention is generally directed to cationic crosslinked waxy starch products and their uses. Embodiments of the invention encompass cationic crosslinked waxy starch products, a method for producing the starch products, and paper products incorporating the cationic crosslinked waxy starch products.

BACKGROUND

It is well known that paper products may be improved as a result of incorporating various additives. Cationic crosslinked starches are known as having an ability to improve properties such as dry strength of paper products, and an ability to improve the papermaking process by improving retention and drainage. Cationic crosslinked starches are well known products.

U.S. Pat. No. 5,122,231 relates to cationic crosslinked starch products, that may include waxy starch products. The emphasis in this patent is related to cationic crosslinked dent starch products. The patent also describes the use of the cationic crosslinked starch products in the production of paper products. The cationic crosslinked starch products are required to have a hot paste Brookfield viscosity of about 500 cps to about 3000 cps as measured at a 1.0 Baume slurry solids which equates to 2.0% dry solids.

U.S. Pat. No. 5,368,690 relates to cationic crosslinked starch products that are useful in the production of paper. The cationic crosslinked starch products are described as having a Brabender breakdown viscosity of 2 to 85%, which relates to the extent of crosslinking level.

It would therefore be desirable to provide new cationic crosslinked waxy starch products that will enhance the processing of paper products and the properties of the resultant paper products.

SUMMARY

Various embodiments of the present invention are directed to cationic crosslinked waxy starch products, paper products incorporating such starch products, and methods of using such products. One embodiment provides a cationic crosslinked waxy starch product having a Brookfield viscosity ranging from about 700 cps to about 2500 cps (Centipoise) as measured in accordance with CRA Method B-54 at 0.5% solids using spindle number 21 at 20 rpm (revolutions per minute) and at a temperature of 97° C. Another embodiment of the invention is further directed to a method for producing such cationic crosslinked waxy starch products. Further embodiments of the invention are directed to the use of such cationic crosslinked waxy starch products in the preparation of paper products and to paper products so made.

DETAILED DESCRIPTION

Various embodiments of the present invention are directed to cationic crosslinked waxy starch products, paper products incorporating such starch products, and methods of using such products. One embodiment provides a cationic crosslinked waxy starch product having a Brookfield viscosity ranging from about 700 cps to about 2500 cps (Centipoise) as measured in accordance with CRA Method B-54 at 0.5% solids using spindle number 21 at 20 rpm (revolutions per minute) and at a temperature of 97° C. Another embodiment of the invention is further directed to a method for producing such cationic crosslinked waxy starch products. Further embodiments of the invention are directed to the use of such cationic crosslinked waxy starch products in the preparation of paper products and to paper products so made.

In more detail, the cationic crosslinked waxy starch product having a Brookfield viscosity ranging from about 700 cps to about 2500 cps as measured in accordance with CRA Method B-54 at 0.5% solids using spindle number 21 at 20 rpm and at a temperature of 97° C., is described as follows. The waxy starch may be derived from any suitable source such as waxy corn starch, waxy potato starch, waxy sweet potato starch, waxy tapioca starch, waxy rice starch, waxy sago starch, waxy sorghum starch, and mixtures thereof. Waxy starch is defined as starch that contains essentially 100% amylopectin as referenced in Corn Chemistry and Technology (1999), pp. 480. Preferably, the waxy starch is waxy corn starch.

Waxy starch products in embodiments of the present invention have a Brookfield viscosity ranging from about 700 cps to about 2500 cps as measured in accordance with CRA Method B-54 at 0.5% solids using spindle number 21 at 20 rpm and at a temperature of 97° C. In a preferred embodiment, the Brookfield viscosity ranges from about 800 cps to about 2000 cps. In a more preferred embodiment, the Brookfield viscosity ranges from about 1000 cps to about 1500 cps. The test procedure for determining the Brookfield viscosity is described herein.

In producing the cationic crosslinked waxy starch, any conventional method may be used such as those disclosed in U.S. Pat. No. 5,122,231 and U.S. Pat. No. 5,368,690 that relate to methods for preparing cationic crosslinked starches. For example, any waxy starch may be cationized and crosslinked, in either order or simultaneously, and the reaction may be allowed to proceed under conditions to produce a cationic, crosslinked waxy starch having a Brookfield viscosity ranging from about 700 cps to about 2500 cps as measured in accordance with CRA Method B-54 at 0.5% solids using spindle number 21 at 20 rpm and at a temperature of 97° C. Preferably, the process is carried out under conditions that will produce a cationic crosslinked waxy starch having a viscosity of from about 800 cps to about 2000 cps, and more preferably, from about 1000 cps to about 1500 cps. The waxy starch utilized in the process may be any of the waxy starches identified above. In one useful embodiment, the waxy starch is waxy corn starch. While any cationizing agent may be utilized in the process, it is preferred that the cationizing reaction be achieved utilizing a component selected from an amino ion, imino ion, sulfonium ion, phosphonium ion, ammonium ion and mixtures thereof, preferably, a quaternary ammonium ion. Though many crosslinking agents are suitable for use in the present process, embodiments of the invention utilize a component selected from a multi-functional etherifying agent, a multi-functional esterifying agent and mixtures thereof. Suitable crosslinking agents for select embodiments are epichlorohydrin, a dicarboxylic anhydride, phosphorous oxychloride, an alkali earth metal salt of trimetaphosphate, a linear mixed anhydride, a polyamine polyepoxide resin and mixtures thereof. One preferred embodiment employs an alkali earth metal salt of trimetaphosphate as the crosslinking agent.

In one embodiment, preparing the cationic crosslinked waxy starch products includes generally monitoring the reaction for completion by measuring the viscosity to ensure that the viscosity value ranges from about 700 cps to about 2500 cps as measured by the test procedure herein. When the viscosity is determined to fall within the desired range, the reaction may be terminated.

A waxy starch, as described herein, is cationized by reacting the waxy starch with any cationizing agent. Exemplary of the cationizing agents are agents having amino ions, imino ions, sulfonium ions, phosphonium ions, or ammonium ions and mixtures thereof. The cationizing reaction may be carried out in any conventional manner such as reacting the waxy starch in an aqueous slurry form with the cationizing agent, usually in the presence of an activating agent such as sodium hydroxide. Another process that may be used is a semi-dry process wherein the waxy starch is reacted with the cationizing reagent in the presence of an activating agent such as sodium hydroxide, in a limited amount of water.

In one embodiment, the cationizing agent has an ammonium ion, and preferably, the ammonium ion is a quaternary ammonium ion. One particularly useful embodiment employs (3-chloro-2-hydroxypropyl)trimethylammonium chloride as a cationizing agent.

The waxy starch, as described herein, may be crosslinked by reacting the waxy starch with any crosslinking agent. The reaction is carried out using any known manner for crosslinking a product. Suitable crosslinking agents for some embodiments include, but are not limited to, a multi-functional etherifying agent, a multi-functional esterifying agent, mixtures thereof, and the like. Specific examples of suitable crosslinking agents include, but are not limited to, epichlorohydrin, a dicarboxylic anhydride, phosphorous oxychloride, an alkali earth metal salt of trimetaphosphate, a linear mixed anhydride, a polyamine polyepoxide resin, mixtures thereof, and the like. The crosslinking reaction may be carried out in any conventional manner such as reacting the waxy starch in an aqueous slurry form with the crosslinking agent, usually in the presence of an activating agent such as sodium hydroxide. Another crosslinking process that may be used is a semi-dry process where the waxy starch is reacted with the crosslinking agent in the presence of an activating agent such as sodium hydroxide, in a limited amount of water.

The waxy starch may be cationized and crosslinked in any order, in producing the cationic crosslinked waxy starch. For example, the starch may be cationized then crosslinked, or the starch may be crosslinked then cationized. Furthermore, the cationizing agent and the crosslinking agent may be utilized simultaneously.

Some embodiments of the invention employ cationic crosslinked waxy starch products in the production of paper. The cationic crosslinked waxy starch products may be incorporated in the production of paper using any conventional manner. For example, the cationic crosslinked waxy starch products may be slurried in water and the resultant slurry heated at a temperature sufficient to achieve gelatinization of the starch slurry to produce a gelatinized starch paste. Typically, the heating to achieve gelatinization is carried out at a temperature above about 90° C. The gelatinized starch paste may then be applied to a cellulosic suspension, particularly a paper furnish, in any known manner. In doing so, the gelatinized starch paste may be applied to the wet-end of a paper machine in a paper fiber thick stock, or a paper fiber thin stock, or a split addition to both the thick stock and thin stock. In applying the gelatinized starch paste to the cellulosic suspension, any amount of starch may be incorporated as desired. Typically, the amount of cationic crosslinked waxy starch to be incorporated ranges from about 0.1% to about 5% by weight based on the paper fiber. In a preferred embodiment, the waxy starch product is present in an amount ranging from about 0.5% to about 2% by weight based on the weight of the fiber.

Furthermore, if desired, conventional additives may be utilized in producing the paper products. For example, there may be incorporated dyes, pigments, sizing additives, retention and drainage aids, aqueous suspensions or solutions of biopolymers or synthetic polymers, and the like.

It Cationic crosslinked waxy starch products in accordance with aspects of the present invention are expected to have utility in fields other than papermaking. Such applications would include, for example, food container manufacture, production of paints, flocculation of aqueous suspensions as in water treatment and ore purification, and the like.

The following examples are presented to illustrate aspects of the present invention and to assist one of ordinary skill in making and using the same. The examples are not intended in any way to otherwise limit the scope of the invention.

EXAMPLES

Test Procedures
Brookfield Viscosity

Brookfield viscosity of a cationic crosslinked waxy starch was determined in accordance with the Standard Analytical Methods of the Corn Refiners Association, Inc. Test Procedure CRA Method B-54 with the conditions specified herein. The instrument utilized in determining viscosity was a Brookfield DV-II+ Viscometer. The test procedure was conducted by cooking a sample, at a hot water bath temperature setting of 97° C., for 10 minutes using spindle number 21 at 20 revolutions per minute. The Brookfield viscosity of the cationic crosslinked starch, which is in the form of a hot paste, was determined using a solids level of 0.5%.

Internal Bond Strength

Internal Bond Strength of Paper (Scott Bond)—TAPPI Test Procedure T 541 om-89

Starch Products

Example 1

Cationic crosslinked waxy corn starch having a Brookfield viscosity of 1200 cps was prepared by charging a reactor with 288,000 lbs dry substance waxy corn starch as a 20 baume slurry with a waxy purity of greater than 95%. 8,054.8 lbs (dry weight basis) of sodium hydroxide was added as a 7% solution, along with 15,039.5 lbs (dry weight basis) of (3-chloro-2-hydroxypropyl)trimethylammonium chloride as a 65% solution, to the slurry. The slurry was then heated to 39.5° C. and allowed to react for a minimum of 10 hours, to achieve a total nitrogen substitution of 0.3% dry basis. After the nitrogen substitution was achieved, a sample of the slurry was measured to ensure that the pH of the reaction slurry was at 11.2. If necessary, the pH is adjusted to 11.2. 20 lbs of food grade sodium trimetaphosphate was added in one portion to the slurry and the slurry was allowed to react for 5 hours. The slurry was brought to a pH of 5.0-5.5 by the addition of 35% hydrochloric acid solution. The slurry was then washed on a standard wash centrifuge, de-watered by a basket centrifuge, and flash dried to a moisture level of 10-12%. The viscosity of the resulting cationic crosslinked waxy starch was 1200 cps as determined by the Brookfield viscosity procedure herein.

Example 2

An alternative method of producing the cationic crosslinked waxy starch of the present invention is as follows. Semi-dry waxy corn starch, having a moisture level of 10-30% is mixed with 2,3-epoxypropyl-N,N,N,-trimethylammonium chloride, and 1,3-dichloro-2-propanol in the presence of sodium hydroxide as an activating agent. It is expected that there will be obtained cationic crosslinked waxy corn starch having a Brookfield viscosity ranging from about 700 cps to about 2500 cps as measured in accordance with CRA Method B-54 at 0.5% solids using spindle number 21 at 20 rpm and at a temperature of 97° C.

Example 3

The process according to Example 1 is followed with the exception that (3-chloro-2-hydroxypropyl)trimethylammonium chloride is replaced by (3-chloro-2-hydroxypropyl) dimethyldodecylammonium chloride. It is expected that there will be obtained cationic crosslinked waxy starch product having a Brookfield viscosity ranging from about 700 cps to about 2500 cps as measured in accordance with CRA Method B-54 at 0.5% solids using spindle number 21 at 20 rpm and at a temperature of 97° C.

Example 4

The process according to Example 1 is followed with the exception that (3-chloro-2-hydroxypropyl)trimethylammonium chloride is replaced by (3-chloro-2-hydroxypropyl) dimethyloctadecylammonium chloride. It is expected that there will be obtained cationic crosslinked waxy starch product having a Brookfield viscosity ranging from about 700 cps to about 2500 cps as measured in accordance with CRA Method B-54 at 0.5% solids using spindle number 21 at 20 rpm and at a temperature of 97° C.

Example 5

The process according to Example 1 is followed with the exception that the sodium trimetaphosphate is replaced by 1,2,4,5-benzenetetracarboxylic dianhydride and is reacted at a pH range of 8-10. It is expected that there will be obtained cationic crosslinked waxy starch product having a Brookfield viscosity ranging from about 700 cps to about 2500 cps as measured in accordance with CRA Method B-54 at 0.5% solids using spindle number 21 at 20 rpm and at a temperature of 97° C.

Example 6

The process according to Example 1 is followed with the exception that the waxy corn starch is replaced by waxy rice starch. It is expected that there will be obtained cationic crosslinked waxy starch product having a Brookfield viscosity ranging from about 700 cps to about 2500 cps as measured in accordance with CRA Method B-54 at 0.5% solids using spindle number 21 at 20 rpm and at a temperature of 97° C.

Example 7

The process according to Example 1 is followed with the exception that the waxy corn starch is replaced by waxy potato starch. It is expected that there will be obtained cationic crosslinked waxy starch product having a Brookfield viscosity ranging from about 700 cps to about 2500 cps as measured in accordance with CRA Method B-54 at 0.5% solids using spindle number 21 at 20 rpm and at a temperature of 97° C.

Example 8

The process according to Example 1 is followed with the exception that the waxy corn starch is replaced by waxy tapioca starch. It is expected that there will be obtained cationic crosslinked waxy starch product having a Brookfield viscosity ranging from about 700 cps to about 2500 cps as measured in accordance with CRA Method B-54 at 0.5% solids using spindle number 21 at 20 rpm and at a temperature of 97° C.

Paper Products

Example 9

In this example there is shown the incorporation of a cationic crosslinked waxy corn starch product having a Brookfield viscosity of 1200 cps prepared in Example 1, in the preparation of a paper product. In this example, the starch product was utilized in the form of a paste. The paper was prepared using a standard Fourdrinier paper machine. The hardwood/softwood bleached fiber was added to a coated broke furnish at the blend chest along with ground calcium carbonate and thick stock alum in conventional amounts. The furnish mixture was further diluted with water, followed by the addition of a starch paste. Before the headbox, silica and trim alum were added in conventional amounts and the furnish was pumped to the headbox for distribution onto the paper machine wire. The paper web was then dried and wound on a roll. The paper produced was a 196 pound coated web grade paper with an ash level of 9%. The paper was produced to have a specified Internal Bond Strength (Scott Bond) value. This was achieved by adjusting the starch addition rate. In producing the paper 15.3 lbs/ton of the cationic crosslinked waxy starch product of Example 1 was added. The paper that was produced in this example was characterized by having a paper production rate of 1.9 reels per hour, and having an Internal Bond Strength of 121.4 kPa/in$^2$.

Example 10

In this example the procedure of Example 9 is followed with the exception that the cationic crosslinked waxy corn starch of Example 1 is replaced by the cationic crosslinked waxy corn starch of Example 2. It is expected that there will be obtained a suitable paper product.

Example 11

In this example the procedure of Example 9 is followed except that the cationic crosslinked waxy corn starch of Example 1 is replaced by, respectively, the cationic crosslinked waxy corn starch products of Examples 3, 4, and 5. It is expected that there will be obtained suitable paper products. In these instances it is further expected that the paper product produced using the starch products of Examples 3, 4, and 5 will be characterized by increased internal sizing.

Example 12

In this example the procedure of Example 9 is followed with the exception that the cationic crosslinked waxy corn starch of Example 1 is replaced by the cationic crosslinked waxy rice starch product of Example 6. It is expected that there will be obtained a suitable paper product.

Example 13

In this example the procedure of Example 9 is followed with the exception that the cationic crosslinked waxy corn starch of Example 1 is replaced by the cationic crosslinked waxy potato starch product of Example 7. It is expected that there will be obtained a suitable paper product.

Example 14

In this example the procedure of Example 9 is followed with the exception that the cationic crosslinked waxy corn starch of Example 1 is replaced by the cationic crosslinked waxy tapioca starch product of Example 8. It is expected that there will be obtained a suitable paper product.

The invention has been described with reference to various specific and illustrative embodiments and techniques. However, one skilled in the art will recognize that many variations and modifications may be made while remaining within the spirit and scope of the invention. The entirety of each of the patents and other references identified above is incorporated herein by reference.

What is claimed is:

1. A cationic crosslinked waxy starch product having a Brookfield viscosity ranging from about 1000 cps to about 2500 cps as measured in accordance with CRA Method B-54 at 0.5% solids using spindle number 21 at 20 rpm and at a temperature of 97° C.

2. The cationic crosslinked waxy starch product according to claim 1 wherein the waxy starch is selected from the group consisting of waxy corn starch, waxy potato starch, waxy sweet potato starch, waxy tapioca starch, waxy rice starch, waxy sago starch, waxy sorghum starch, and mixtures thereof.

3. The cationic crosslinked waxy starch product according to claim 2 wherein the waxy starch is waxy corn starch.

4. The cationic crosslinked waxy starch product according to claim 1 wherein the product has a Brookfield viscosity ranging from about 1000 cps to about 2000 cps.

5. The cationic crosslinked waxy starch product according to claim 1 wherein the product has a Brookfield viscosity ranging from about 1000 cps to about 1500 cps.

6. The cationic crosslinked waxy starch product according to claim 1 wherein the waxy starch is cationized by reaction with a component selected from the group consisting of an amino ion, imino ion, sulfonium ion, phosphonium ion, ammonium ion and mixtures thereof.

7. The cationic crosslinked waxy starch product according to claim 6 wherein the waxy starch is cationized by reaction with an ammonium ion wherein the ammonium ion is a quaternary ammonium ion.

8. The cationic crosslinked waxy starch product according to claim 7 wherein the waxy starch is cationized by reaction with (3-chloro-2-hydroxypropyl)trimethyl-ammonium chloride.

9. The cationic crosslinked waxy starch product according to claim 1 wherein the waxy starch is crosslinked by reaction with a component selected from the group consisting of a multi-functional etherifying agent, a multi-functional esterifying agent and mixtures thereof.

10. The cationic crosslinked waxy starch product according to claim 1 wherein the waxy starch is crosslinked by reaction with a component selected from the group consisting of epichlorohydrin, a dicarboxylic anhydride, phosphorous oxychloride, an alkali earth metal salt of trimetaphosphate, a linear mixed anhydride, a polyamine polyepoxide resin and mixtures thereof.

11. The cationic crosslinked waxy starch product according to claim 1 wherein the waxy starch is cationized by reaction with (3-chloro-2-hydroxypropyl)trimethyl-ammonium chloride, and the waxy starch is crosslinked by reaction with at least one alkali earth metal salt of trimetaphosphate.

12. A paper product comprising a cationic crosslinked waxy starch product having a Brookfield viscosity ranging from about 1000 cps to about 2500 cps as measured in accordance with CRA Method B-54 at 0.5% solids using spindle number 21 at 20 rpm and at a temperature of 97° C.

13. The paper product according to claim 12 wherein the waxy starch is selected from the group consisting of waxy corn starch, waxy potato starch, waxy sweet potato starch, waxy tapioca starch, waxy rice starch, waxy sago starch, waxy sorghum starch, and mixtures thereof.

14. The paper product according to claim 13 wherein the waxy starch is waxy corn starch.

15. The paper product according to claim 12 wherein the cationic crosslinked waxy starch product has a Brookfield viscosity ranging from about 1000 cps to about 2000 cps.

16. The paper product according to claim 12 wherein the cationic crosslinked waxy starch product has a Brookfield viscosity ranging from about 1000 cps to about 1500 cps.

17. The paper product according to claim 12 wherein the waxy starch is cationized by reaction with a component selected from the group consisting of an amino ion, imino ion, sulfonium ion, phosphonium ion, ammonium ion and mixtures thereof.

18. The paper product according to claim 17 wherein the waxy starch is cationized by reaction with an ammonium ion wherein the ammonium ion is a quaternary ammonium ion.

19. The paper product according to claim 18 wherein the waxy starch is cationized by reaction with (3-chloro-2-hydroxypropyl)trimethylammonium chloride.

20. The paper product according to claim 12 wherein the waxy starch is crosslinked by reaction with a component selected from the group consisting of a multi-functional etherifying agent, a multi-functional esterifying agent and mixtures thereof.

21. The paper product according to claim 12 wherein the waxy starch is crosslinked by reaction with a component selected from the group consisting of epichlorohydrin, a dicarboxylic anhydride, phosphorous oxychloride, an alkali earth metal salt of trimetaphosphate, a linear mixed anhydride, a polyamine polyepoxide resin and mixtures thereof.

22. The paper product according to claim 12 wherein the waxy starch is cationized by reaction with (3-chloro-2-hydroxypropyl)trimethylammonium chloride, and the waxy starch is crosslinked by reaction with at least one alkali earth metal salt of trimetaphosphate.

23. The paper product according to claim 12 wherein the cationic crosslinked waxy starch product is present in an amount ranging from about 0.1% to about 5% by weight based on the weight of fiber.

24. The paper product according to claim 23 wherein the cationic crosslinked waxy starch product is present in an amount ranging from about 0.5% to about 2% by weight.

25. A process for preparing a cationic crosslinked waxy starch product having a Brookfield viscosity ranging from about 1000 cps to about 2500 cps as measured in accordance with CRA Method B-54 at 0.5% solids using spindle number 21 at 20 rpm and at a temperature of 97° C. comprising cationizing a waxy starch, crosslinking the waxy starch, and reacting under conditions to prepare the cationic crosslinked waxy starch product having a Brookfield viscosity ranging from about 1000 cps to about 2500 cps as measured in accordance with CRA Method B-54 at 0.5% solids using spindle number 21 at 20 rpm and at a temperature of 97° C.

26. The process according to claim 25 wherein the cationic crosslinked waxy starch product has a Brookfield viscosity ranging from about 1000 cps to about 2000 cps.

27. The process according to claim 25 wherein the cationic crosslinked waxy starch product has a Brookfield viscosity ranging from about 1000 cps to about 1500 cps.

28. The process according to claim 25 wherein the waxy starch is selected from the group consisting of waxy corn starch, waxy potato starch, waxy sweet potato starch, waxy tapioca starch, waxy rice starch, waxy sago starch, waxy sorghum starch, and mixtures thereof.

29. The process according to claim 25 wherein the waxy starch is cationized by reaction with a component selected from the group consisting of an amino ion, imino ion, sulfonium ion, phosphonium ion, ammonium ion and mixtures thereof.

30. The process according to claim 25 wherein the waxy starch is crosslinked by reaction with a component selected from the group consisting of a multi-functional etherifying agent, a multi-functional esterifying agent and mixtures thereof.

31. The process according to claim 25 wherein the waxy starch is crosslinked by reaction with a component selected from the group consisting of epichlorohydrin, a dicarboxylic anhydride, phosphorous oxychloride, an alkali earth metal salt of trimetaphosphate, a linear mixed anhydride, a polyamine polyepoxide resin and mixtures thereof.

32. The process according to claim 25 wherein the waxy starch is cationized by reaction with (3-chloro-2-hydroxypropyl)trimethylammonium chloride, and the waxy starch is crosslinked by reaction with at least one alkali earth metal salt of trimetaphosphate.

* * * * *